Patented Mar. 31, 1925.

1,531,836

UNITED STATES PATENT OFFICE.

FERDINAND BLUMENTHAL, OF COLOGNE-ON-THE-RHINE, GERMANY.

BASE-EXCHANGING COMPOSITION AND PROCESS FOR MANUFACTURING THE SAME.

No Drawing.   Application filed August 2, 1921.   Serial No. 489,380.

*To all whom it may concern:*

Be it known that I, FERDINAND BLUMENTHAL, chemist, a citizen of Germany, residing at Cologne-on-the-Rhine, Germany, Hermann-Pflaumestrasse 23, have invented certain new and useful Improvements in Base-Exchanging Compositions and Processes for Manufacturing the Same, of which the following is a specification.

The present invention refers to base exchanging compositions and processes for manufacturing the same.

The new base exchanging compounds contain alkali metal compounds, aluminium oxide, silicic acid, heavy metal oxides. As heavy metal oxides those of the iron group are suitable, for instance iron oxide. The products contained in these oxides are obtained by the action of alkali-metal aluminates on the precipitates from alkali metal silicate solutions and solutions of heavy metal salts.

The new base exchanging compounds obtained by the action of alkali metal aluminates in aqueous solution on the precipitates from the interaction of alkali metal silicates and soluble metal salts have the valuable property of larger base exchanging action than the compounds themselves from metal salts and alkali metal silicates. From these reasons the base exchange is essentially more effective and of longer duration. The manufacture of the compositions from the action of alkali metal aluminates on the precipitates from the interaction of alkali metal silicates and metal salts may be carried out in a very easy manner, because a washing out of the composition may be omitted and the physical structure of the new compositions necessary or useful for the base exchange may be obtained even in the presence of a surplus of free alkalies. A further advantage of the new compositions is that they are very resistant against the action of water, salts, acids, bases and are not chemically or physically decomposed or destroyed during the base exchange, even in the presence of carbonic acid.

The precipitates from alkali metal silicates, with which the alkali metal aluminates are brought into reaction may be obtained from solutions of the salts of iron, chromium, tungsten, cobalt, copper, nickel and such like, generally and preferably of the iron group.

The process for manufacturing the base exchange compositions according to the present invention may be carried out by preparing the heavy metal silicates from alkali metal silicates and soluble heavy metal salts, separating the formed precipitate from the liquid, washing it out (which step may be omitted) and causing alkali metal aluminate to act on it. Another way of carrying out the process consists in adding a solution of alkali metal aluminates to the metal silicates precipitate before its separation from the parent liquor and the drying of the precipitate while repeatedly stirring. One may also mix the precipitate of metal silicates with a soluble aluminium salt and then add to the said mixture a solution of alkali metal hydroxide. The thus treated precipitate is then separated from the parent liquor, dried and moistened with water which latter treatment causes a hydration. This hydration of the product of the reaction of alkaline aluminates with the heavy metal silicates can be effected by treating the product with steam or warmed water, one may however also use water of ordinary temperature.

In the following I give some examples for manufacturing the new compositions:

1/. 20 kilograms sodium water glass of about 38° Baumé are diluted with 200 liters water and mixed with 4.5 kilograms ferric chloride dissolved in 150 liters water under constant stirring. The amount of the ferric chloride solution may be varied. One adds preferably such an amount of ferric chloride solution that the mixture has a neutral or feebly acid reaction. The precipitate is separated from the liquid by decantation or filtration and pressed off, dried in the air and may be granulated. The yield of the precipitate when dried in the air is about 8.8 kilograms. The precipitate dried in the air has the following composition:

|  | Per cent. |
|---|---|
| Loss by heating | 30.6 |
| $SiO_2$ | 52.5 |
| $Fe_2O_3$ | 14.7 |
| $Na_2O$ | 2.4 |

The power of base exchange is 0.99%, wherein the power of base exchange expresses the amount of CaO, absorbed by the mass when hard water with a velocity of about 4 meters is filtered through a layer of about 60 centimeters. For regeneration one uses after each exhaustion of the mass about the fivefold of the theoretically required amount of sodium chloride. In the place of ferric chloride one may also use iron sulphates (ferric sulphate or ferrous sulphate), ferric nitrate, iron acetate or other soluble iron salts.

To the said precipitate one adds under constant stirring a solution of alkali metal aluminate which is obtained by mixing a solution of 6.6 kilograms crystallized aluminium chloride with a solution of sodium hydroxide until solution of the precipitate of aluminium hydroxide, at first formed. After settling the undissolved residue is separated from the liquid, pressed off dried in the air and, if desired, granulated. The yield is about 13.5 kilograms. The composition of the transformed compound, dried in the air, is the following:

|  | Per cent. |
|---|---|
| Loss by heating | 27.5 |
| $SiO_2$ | 41.2 |
| $Fe_2O_3 + Al_2O_3$ | 21.5 |
| $Na_2O$ | 9.2 |

Finally one may hydrate the product by the action of water, as by steam, warmed water, or cold water.

The power of base exchange is, after removal of the alkali uncombined or in surplus by washing out the mass with water, about 3.2%. The power of base exchange expresses the amount of CaO absorbed by the amount of the mass.

2/. 20 kilograms water glass of about 38° Baumé are precipitated with 7.5 kilograms copper sulphate dissolved in about 150 liters water with constant stirring. The precipitate is separated from the liquid and pressed off, dried in the air and may be granulated. The yield of the precipitate dried in the air is 10.3 kilograms. The composition of the precipitate dried in the air is the following:

|  | Per cent. |
|---|---|
| Loss by heating | 28.28 |
| CuO | 18.28 |
| $SiO_2$ | 51.24 |
| $Fe_2O_3 + Al_2O_3$ (from impurities of the water glass) | 1.04 |
| $Na_2O$ | 0.49 |

The power of base exchange is 0.14%.

In the place of copper sulphate, one may use copper chloride, copper nitrate, copper acetate or other soluble copper salts.

The said precipitate of copper silicate is mixed under constant stirring with a solution of sodium aluminate obtained by mixing a solution of 6.6 kilograms crystallized aluminium chloride with a solution of sodium hydroxide until solution of the precipitate of aluminium hydroxide, at first formed. After settling the undissolved substance is separated from the liquid, pressed off, dried in the air and granulated. The yield is 12.6 kilograms dried in the air.

The composition of the washed compound, dried in the air is:

|  | Per cent. |
|---|---|
| Loss by heating | 28.4 |
| $SiO_2$ | 40.38 |
| CuO | 14.3 |
| $Al_2O_3 + Fe_2O_3$ | 9.9 |
| $Na_2O$ | 6.67 |

The power of base exchange of the product, freed of uncombined alkali by washing with water and dried in the air is 1.35%. For regeneration one uses after each exhaustion about the fivefold of the theoretically required amount of sodium chloride.

Finally one may hydrate the product by the action of water as by steam, warmed water, or cold water.

The new compounds are hard substances of high base exchange power, the physical character is not unfavourably influenced by the presence of alkalies. The quantitative power of base exchange depends upon the amount of alkaline solution used in the preparation. The compounds are cheap because one obtains by the action of alkali metal aluminates on the metal silicates an increased amount of base exchanging masses when compared with the initial metal silicates.

The preparation of the precipitates and the reaction with alkali metal aluminates may be carried out at ordinary temperature which is a further reason for the cheapness of the compounds. One may, however, for accelerating the process heat the solution preferably not above 100 degrees centigrade.

I claim:—

1. The base exchange compositions hereinbefore described containing after heating until all water has been evaporated alkali metal compound, aluminium oxide, silicic oxide and more than 10% heavy metal oxide.

2. The base exchange compositions hereinbefore described containing after heating until all water has been evaporated alkali metal, aluminium oxide, silicic oxide and more than 10% oxide of a metal of the periodic iron group.

3. The base exchange compositions hereinbefore described containing after heating until all water has been evaporated alkali metal, aluminium oxide, silicic oxide and more than 10% oxide of iron.

4. The process for manufacturing base exchange compositions which consists in causing a soluble alkali metal silicate to act on a soluble salt of the heavy metals and treating the precipitate thus obtained, with an alkali metal aluminate.

5. The process for manufacturing base exchange compositions which consists in causing a soluble alkali metal silicate to act on a soluble salt of a metal of the iron group and treating the precipitate thus obtained, with an alkali metal aluminate.

6. The process for manufacturing base exchange compositions which consists in causing a soluble alkali metal silicate to act on a soluble iron salt and treating the precipitate thus obtained, with an alkali metal aluminate.

7. The process for manufacturing base exchange compositions which consists in causing a soluble alkali metal silicate to act on a soluble salt of the heavy metals, treating the precipitate thus obtained, with an alkali metal aluminate, separating the undissolved part thereof from the mother liquor, with the use of pressure, drying it and moistening the dried mass with a small quantity of water.

8. The process for manufacturing base exchange compositions which consists in causing a soluble alkali metal silicate to act on a solution of an iron salt, treating the precipitate thus obtained with an alkali metal aluminate, separating the undissolved part thereof from the mother liquor with the use of pressure, drying it and moistening the dried mass with a small quantity of water.

9. The process for manufacturing base exchange compositions which consists in causing a soluble alkali metal silicate to act on a soluble iron salt, treating the precipitate thus obtained with an alkali metal aluminate, separating the undissolved part thereof from the mother liquor with the use of pressure, drying it and moistening the dried mass with a small quantity of water.

In testimony whereof, I hereunto affix my signature.

FERDINAND BLUMENTHAL.